United States Patent [19]

Matheny

[11] 4,010,332
[45] Mar. 1, 1977

[54] LINK CIRCUIT FOR INTERCOM UNIT

[75] Inventor: Coy Edwin Matheny, Fulton, Ky.

[73] Assignee: International Telephone and Telegraph Corporation, New York, N.Y.

[22] Filed: Aug. 11, 1975

[21] Appl. No.: 603,397

[52] U.S. Cl. .............................. 179/99; 179/18 AD;
[51] Int. Cl.[2] ........................................ H04M 1/72;
 H04M 9/04
[58] Field of Search ................. 179/1 H, 18 AD, 99

[56] References Cited
UNITED STATES PATENTS

| | | | |
|---|---|---|---|
| 3,299,217 | 1/1967 | Burns | 179/99 |
| 3,778,554 | 12/1973 | Weiner | 179/18 AD |
| 3,860,763 | 1/1975 | Sudoh et al. | 179/99 |
| 3,931,478 | 1/1976 | Warman | 179/99 |

*Primary Examiner*—Kathleen H. Claffy
*Assistant Examiner*—Randall P. Myers
*Attorney, Agent, or Firm*—J. B. Raden; M. M. Chaban

[57] ABSTRACT

An intercommunication link for a multiple link key telephone system with a combination lamp-button on each handset for each available link. In each link, a line seeking intercom service is sensed to operate a relay in the link selected. A lamp flash signal on the lamp of the selected link is initiated. In this condition, all other links are disabled and none can be accessed when one link is in the lamp flashing condition. The called local number of the desired intercom station is dialed and when the called station line is answered, a second relay in the selected link operates to release the first relay. On operation of the second relay, a steady lamp indication is sent to both stations in the conversation. Other free links may be accessed at this time. Thus, only during this intercom signaling phase are the remaining free links affected.

6 Claims, 2 Drawing Figures

FIG. 2

LINK CIRCUIT FOR INTERCOM UNIT

BACKGROUND OF THE INVENTION

Key telephone systems, of course, are well-known in the art. In such systems, plurality of lines have appearances at one or more stations so that each station may have access to more than one line. Audible and visual signalling is used to indicate the condition of each line, i.e., being rung, in use, off-hook, or being held. The signalling is applied to each line at all stations at which that line has an appearance.

Such systems invariably have an intercom whereby one station can communicate with another station by signalling the other station audibly, and whereby both stations may converse with one another over an intercom link circuit. An example of such an apparatus is shown in U.S. Pat. No. 3,787,640 to Bush et al. issued Jan. 22, 1974. In that patent, a non-locking key is used to implement and control the intercom feature.

SUMMARY OF THE INVENTION

The link circuit of the present invention may be used as the only intercom link circuit (allowing only one intercom call at a time) but preferably the link circuit is used with identical link circuits to provide a plurality of possible intercom calls for a larger plurality of lines which may total eighteen lines or multiples thereof.

A calling station accesses an idle link circuit by depressing the intercom button for that link. The calling station dials the intercom number of the desired station (usually a two-digit number) and the dialed station is audibly signalled. The link lamp exhibits a calling visual flashing signal at all stations having access to that link.

A link circuit has capability for sensing when a station accesses the link to call another station and sensing when the called station answers. An idle link provides no lamp indication. A link being used to place a call provides a flashing lamp during the signalling phase. A link that has a two-party conversation established provides a steadily illuminated lamp indication.

When a link circuit is in use in the dialing state, the calling link disables all other idle links. That is, a link idle when another link is used to dial an intercom call cannot produce any lamp indication even if accessed during this phase. Once link circuit has established a two station conversation path, that link is not affected by any other link nor does it have any effect on any other link.

Once the dialing has been completed by the calling station and the link circuit is awaiting an answer, a change in current is required for a period of time in excess of 300 milliseconds to provide an answer indication. The current threshold necessary to trigger the answer indication is sufficiently great to ensure that no current variation in the voice frequency range can trigger the answer response.

A time-out interval with a selectable period such as 16 or 32 seconds is provided. With a selected time-out interval of 16 seconds the link circuit will go into the busy mode 16 seconds after the calling station goes off hook if no answer response has been indicated. The same is true for a 32-second time out after the setting of longer time interval. This time-out ensures that all idle links will not be disabled for a period longer than the time-out period set.

It is therefore an object of the invention to provide an intercom link circuit arrangement which allows multiple intercom talking paths each with its individual controlling link, employing two relays per link.

It is a further object of the invention to provide an improved and simplified intercom link circuit.

It is a still further object of the invention to provide a plural link intercom circuit, in which one link in the calling or dialing state will disable all idle links until the calling link is answered or until a time-out period has expired.

It is a further object of the invention to provide an improved link circuit with improved immunity to voice frequency signals or signals of short duration whereby to prevent such signals from triggering an answer response.

BRIEF DESCRIPTION OF THE DRAWINGS

FIG. 2 is a detailed schematic circuit of a link circuit as shown in FIG. 1.

DETAILED DESCRIPTION

Figure 1:
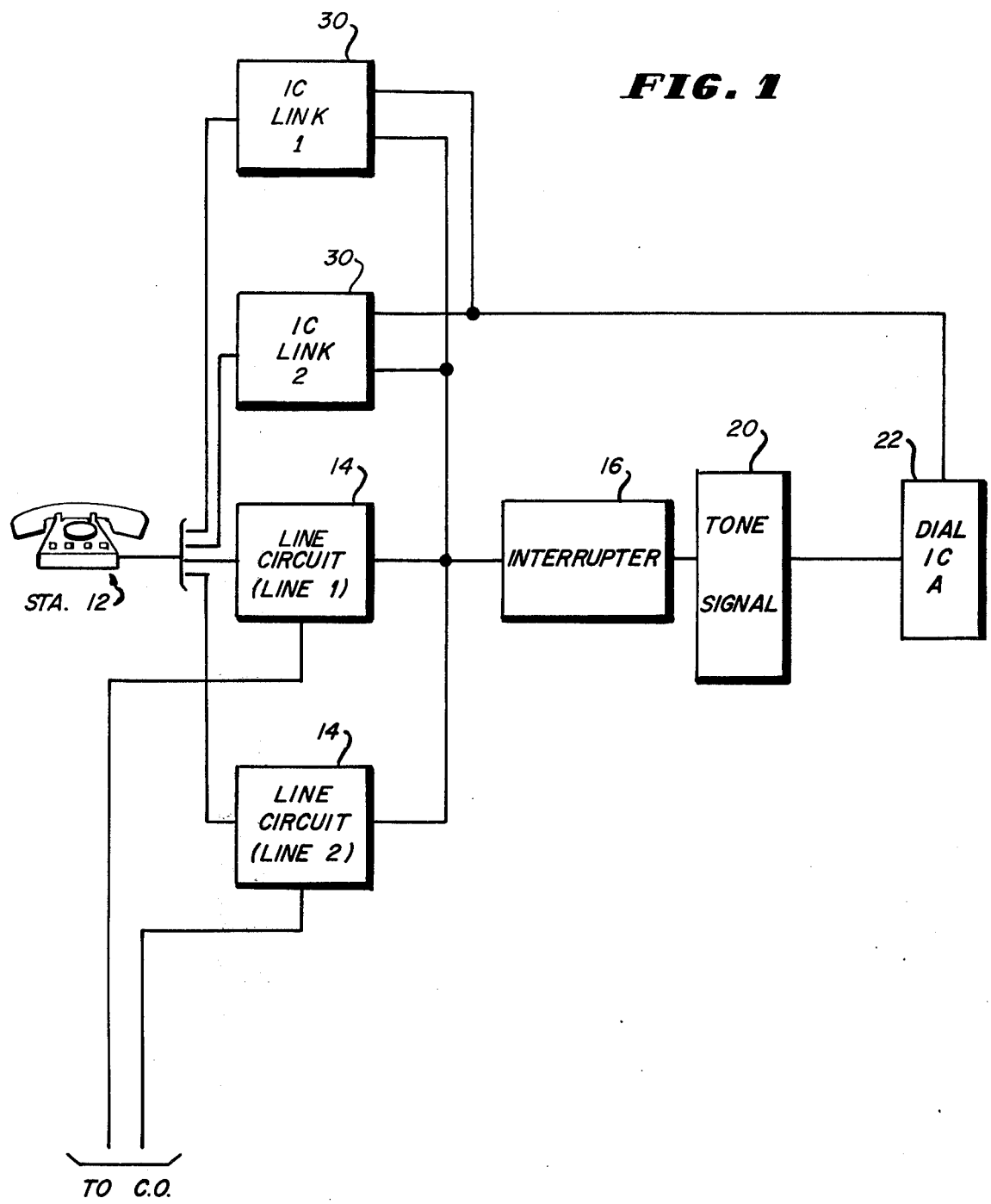
FIG. 1 is a block diagram of an intercom arrangement using my invention.

In FIG. 1 there is shown the intercom portion of a key telephone system of any known type with only one station 12 shown. Naturally, such a system would have multiple stations for the two lines shown. In the form shown, the station has access to two lines, line No. 1 and line No. 2 through individual illuminating pushbuttons or line keys as is known. Each line has a line circuit 14 of any known type such as that shown in U.S. Pat. No. 3,436,488 to Barbato, issued April 1969. An interrupter 16 of any known type is used to provide conventional interrupted visual and audible signals to the line circuits. One form of electronic interrupter is shown in my co-pending U.S. Pat. application Ser. No. 469,952, filed May. 15, 1974.

A conventional tone signalling unit 20 is used to provide the necessary tones such as dial tone and ring back tone to the calling station and ringing tone to the called station in any known manner.

Dial intercom circuit 22 is provided to permit selection of a called station from a plurality of available stations. When each such unit allows selection of n stations, providing two such units allows selection from among 2n stations. Such dial intercom units may be of any type wellknown in the art to receive dial pulses and select the dialed station. One such circuit is shown in U.S. Pat. No. 3,609,249 issued to E. Pinede et al. on Sep. 28, 1971.

For each intercom call available for simultaneous use, there is provided a link circuit 30. To provide two such conversations, two such circuits are provided. Naturally, in larger systems or in systems for which intercom traffic is likely to be heavy more units can be provided. Such link units form the major feature of the present invention as shown in detail in FIG. 2.

Figure 2:
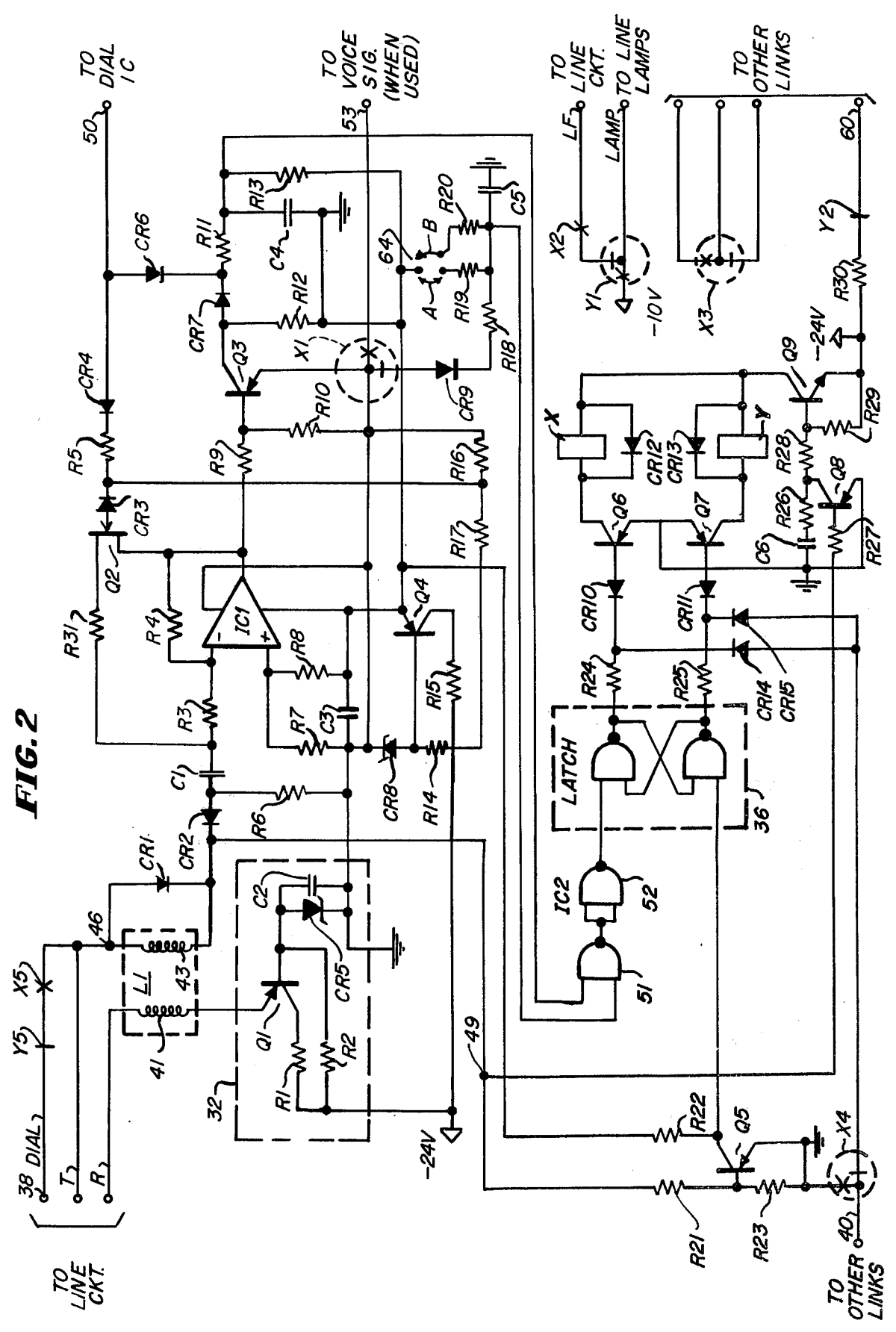

The operation of the circuit of FIG. 2 is as follows: When a resistance such as from a telephone station instrument is connected across the tip and ring leads T and R of the link circuit, a current path may be traced from −24 VDC talk battery through the series regulator 32. This regulator is comprised of resistors R1 and R2 feeding transistor Q1, and the parallel combination of zener diode CR5 and capacitor C2 completing the path to ground one winding 41 of inductor L1 through the R lead to the circuit connections through the resistance load of the station to the other winding 43 of inductor L1, and through the parallel combinations of (a) the series connections of diode CR2 and resistor R6, and (b) the series connections of resistor R21 and and the emitter base junction of transistor Q5.

The DC voltage drop across resistor R6 is capacitively coupled via capacitor C1 to resistor R3, and the input resistor to input amplifier IC-1. A ground is connected to lead 50 of the present circuit until dialing has been completed. This ground is used to run on FET Q2 to provide a quick charge and discharge path for capacitor C1 and to disable the answer timing circuit of capacitor C4 and resistor R13.

When the initial station resistance termination is connected between the tip and ring leads, capacitor C1 charges quickly to the DC potential difference of the voltage at the junction of diode CR2 and resistor R6 and the reference voltage of the operational amplifier.

Transistors Q5 and Q8 are turned on by the DC potential at the junction 49 of resistors R21 and R27 and diodes CR1 and CR2. Transistor Q8 on being turned on discharges capacitor C6 and turns on transistor Q9. Transistor Q9 supplies −24 VDC bias to the X and Y relays at this time.

Before Q5 had turned on, a logic 0 was present at its collector. This logic 0 acts to reset the latch circuit 36 made up of the paired gates designated as quad two-input N and CMOS gates. When set in the reset mode, a logic 1 is present at the latch output to resistor R25 and a logic 0 is present at the latch output to resistor R24. The logic 0 is a −8.4 VDC which turns on transistor Q6 the driver for relay X. The X relay is energized via a current path from ground through the collector-emitter path of transistor Q6, the coil of relay X, and through the emitter-collector path of transistor Q9 to −24 VDC. The X relay is energized and the Y relay remains de-energized. On energization, the X relay operates its five sets of contacts. At contacts X2, a lamp flash input signal is closed to the line lamp lead. At closed contacts X5, negative voltage through the voltage regulator 32 is applied to common dialing equipment via the dial lead 38 to the circuit connector. At contact X4, ground is switched to lead 40 of the printed circuit connector, this lead being directed to the other links of the system to disable all idle link circuits. That is, in any idle link circuit, ground on lead 40 prevents transistors Q6 and Q7 in that link from being turned on and its X relay cannot be energized. Thus, the link cannot access the common equipment until the link using the common equipment releases its X relay and the ground on lead 40 is released. The user than dials the desired station number.

During dialing, the voltage from the dial lead 38 to winding 43 follows the dial pulses. That is, during the open circuit condition of the dial, the voltage applied to lead 38 is zero, and during the closed circuit condition of the dial, the voltage at terminal 46 is negative 5 VDC or more. Capacitor C1 discharges and charges during dialing, but has sufficient time to stabilize at the end of dialing before the ground is removed from lead 50 of the printed circuit connector. Under these stable conditions, the output of operational amplifier IC1 maintains a reference voltage of approximately −4.2 VDC. FET transistor Q2 is maintained off due to the −12 VDC on its gate and transistor Q3 is turned on by the −4.2 output of amplifier IC1. Transistor Q3 in its "on" state provides a ground diode CR7 which disables the charging path of capacitor C4.

After dialing is complete, the link circuit waits for the called party to answer. When the called party answers, the current flow in the battery feed circuit of L1 increases, causing more negative voltage to appear across resistor R6. This negative voltage change is coupled to the input resistor (R3) of the operational amplifier IC1 via capacitor C1. The output of IC1 switches from −4.2 VDC to ground for approximately 600 msec. Transistor Q3 is turned off by this bias change and allows capacitor C4 to charge toward the logic supply voltage.

Approximately 300 msec. after transistor Q3 has been turned off, the charge on capacitor C4 is at the logic 0 threshold to cause the output of NAND gate 51 to switch from logic 0 to logic 1. NAND gate 52 acts as an inverter, the output of which, causes the latch to set in the answer or time-out mode. A logic 1 is now present at the connection of resistor R24 to the latch and a logic 0 is present at the connection of resistor R25 to the latch. This bias combination causes transistor Q6 to turn off and transistor Q7 to turn on. Transistor Q6 on shutting off de-energizes the X relay and transistor Q7 causes the Y relay to be energized. Contacts Y5 of the Y relay release the common equipment from terminal lead 38. At contacts Y1, a steady lamp voltage is switched to the lamp lead. Contacts Y2 open to remove the privacy voltage from terminal lead 60 of the printed circuit connector. Restoration of relay X, further removes the privacy voltage to lead 40 at contacts X4, and at contacts X3, a disabling path to other links is removed. The intercom path is now complete and the remaining links are enabled.

Next will be explained the time-out feature in which an intercom link is seized and the call is not answered. When current first flows in the battery feed circuit of inductor L1 and the X relay is energized, an operating interval for time-out circuit is initiated. By the setting of strap A or B at strap terminals 64, the time-out period to be used is selected and set, at periods dependent on the resistance of R19 and R20 and the capacitance of C5. Unless the call is completed within the selected and set time period which may be 15 or 30 seconds, the charge on capacitor C5 will accumulate to a point where the output gate 51 will switch from a logic 0 to a logic 1 and produce the answer condition. That is, the Y relay will energize and the X relay will deenergize.

It should be noted that during dialing, the X relay is held energized even though transistor Q8 is turned off, transistor Q9 is held on by the charging action of capacitor C6 through resistors R26 and R28 and the emitter-base junction of transistor Q9.

The operational amplifier and CMOS quad two input NAND gate receives its supply voltage from the −8.4 volt regulator comprised of transistor Q4, diode CR8 and resistors R14 and R15. The operational amplifier reference voltage which is applied to the non-inverting or + input is supplied by the voltage divider action of resistors R7 and R8.

Resistors R30 and R31 are used as current limiters. Q2 may be a suitable FET which has an "on" resistance sufficient to protect itself from current overload, but is an FET were used with a lower "on" resistance, a series resistance such as R31 would be necessary. Resistor R30 is inserted to protect against wiring errors by the installer.

When the termination is removed from between the tip and ring leads of the printed circuit connector, transistor Q5 is turned off. When there is no current flow in the battery feed circuit of L1 there is no negative voltage at terminal 33 of winding 43 to cause transistor Q5 to conduct. When transistor Q5 ceases to conduct, its collector voltage changes from ground to the logic supply voltage (−8.4 V). This voltage change causes the latch 36 to reset to its state productive of a logic 1 at R25 and a logic 0 at R24.

When the X relay de-energizes, its contacts X1 connect a ground to diode CR9. This ground is connected to the junction of capacitor C5, resistors R19, R20, and R18 by the diode CR9 and resistor R18. Capacitor C5 is discharged by this ground and awaits another cycle of operation.

As mentioned previously, the selectible time (which in one form may allow the choice of 15 or 30 seconds) is provided by the use of terminal board 64 in which either strap A or strap B may be set to change the resistance in the circuit and the resultant charge on capacitor C5. By providing resistances of known values, and by changing the value capacitor C5, the time-out period could also be changed to other time periods.

I claim:

1. An intercom circuit including a plurality of link circuits for controlling supervisory signalling between respective calling and called station pairs, each link circuit including a first relay, the first relay in one link circuit responsive to a calling station signalling a called station to attempt the completion of an intercom call over said one link circuit between said stations, means in said one link circuit responsive to operation of said first relay in said one link circuit for disabling the first relays in each of the remaining link circuits from operating during the pendency of operation of said first relay, and means in said one link circuit operated on completion of said intercom call for causing restoration of said first relay of said one link circuit.

2. An intercom circuit as claimed in claim 1, wherein there is a second relay in each link circuit, the second relay of said one link circuit operated responsive to the completion of said intercom call by the called party in response to operation of said restoring means for restoring the first relay in the same link circuit and to terminate the disabling of first relays in the remaining link circuits.

3. An intercom circuit as claimed in claim 2, wherein there is an operating path to said second relay in each link circuit, said operating path being unaffected by operation of a first relay in any other link circuit.

4. An intercom circuit as claimed in claim 3, wherein the operating path in each link circuit includes the restoring means for that link circuit, each restoring means comprising a two output latch circuit with one output feeding the second relay for that link circuit and the other output feeding the first relay of that link circuit.

5. An intercom link circuit for supervising the condition of a call between a calling station and a called station, comprising means responsive to said calling station going off-hook for enabling said link circuit, a bistable circuit responsive to said calling station going off-hook for switching to a first condition, a first relay operated responsive to said bistable circuit switching to said first condition for enabling dialing from said calling station, said bistable circuit responsive to said called station going off-hook for switching to a second condition, a second relay operated when said bistable circuit is in said second condition, said first relay restoring responsive to said bistable circuit switching to said second condition, and means responsive to said first relay remaining operated for a predetermined interval for switching said bistable circuit to said second condition to operate said second relay and restore said first relay.

6. A link circuit as claimed in claim 5, wherein there is means for sensing the current fed to said link circuit responsive to said calling station going off-hook for operating said first relay, said current sensing means responsive to said called station going off-hook for feeding current to said link circuit for operating said second relay.

* * * * *